United States Patent [19]
Sartor

[11] Patent Number: 4,697,360
[45] Date of Patent: Oct. 6, 1987

[54] SKI BOOT WITH SELF-POWERED SKI BOOT CONTROL DEVICES

[75] Inventor: Leo Sartor, Caerano, Italy

[73] Assignee: Caber Italia S.p.A., Montebelluna, Italy

[21] Appl. No.: 869,515

[22] Filed: Jun. 2, 1986

[30] Foreign Application Priority Data

Jun. 5, 1985 [IT] Italy ............................... 41564 A/85

[51] Int. Cl.⁴ ........................... A43B 7/02; A43B 5/04
[52] U.S. Cl. ......................................... 36/2.6; 36/117; 136/291
[58] Field of Search ...................... 36/2.6, 1, 117, 137; 136/291

[56] References Cited

U.S. PATENT DOCUMENTS

| | | | |
|---|---|---|---|
| 3,534,391 | 10/1970 | Bauer | 36/2.6 X |
| 3,859,496 | 1/1975 | Giese | 36/2.6 X |
| 4,507,877 | 4/1985 | Vaccari et al. | 36/2.6 |

FOREIGN PATENT DOCUMENTS 1094154  1/1981  Canada ................................. 136/291
3342276  6/1985  Fed. Rep. of Germany ......... 36/2.6

Primary Examiner—James Kee Chi

[57] ABSTRACT

This invention relates to a ski boot provided with self-powered electric and/or electronic devices. The surface of the boot is covered by a plurality of solar cells, which convert the solar radiation into electric energy which acts to integrate a series of storage batteries contained in a box-type body rigidly attached, in a preferably removable manner, with the footwear structure. The series of storage batteries may be recharged by normal external source of electric energy, while the solar cells have the function of integrating the charge allowing a longer operation of the devices. The electric devices are of the resistive controlled type, for heating the footwear while those electronic consist of means for controlling the correct closure of the boot and/or means for control of the efforts to which the limb of the skier is subjected during use. Such control devices may conveniently cooperate with safety means provided in the ski to determine opening of the safety bindings in case of dangerous overloads.

9 Claims, 2 Drawing Figures

SKI BOOT WITH SELF-POWERED SKI BOOT CONTROL DEVICES

BACKGROUND OF THE INVENTION

This invention relates to a ski boot with self-powered electric and/or electronic devices.

Recently there have been proposed several types of ski boots provided, usually in the wedge, with a series of electric storage batteries having the function of powering an electric resistance placed on the insole of the boot for the purpose of heating internally the boot and therefore the foot of the skier.

The main problem encountered by these devices, is the reduced endurance of the storage batteries which, while supplying current at intervals only, do not afford long periods of use before fresh recharging.

Moreover, for recharging, it is necessary to have available, in addition to an adequate source of electric energy, also an electric adapter means controlled to adjust the characteristics of the storage batteries to the characteristics of the available electric source.

With known boots, the use of the available electric energy is always directed to heating the footwear only whilst no further different uses are envisaged.

SUMMARY OF THE INVENTION

The aim of this invention is to realize a ski boot provided with a plurality of electric and/or electronic devices for both service use and control use.

A consequent primary object is to realize a boot provided with rechargeable independent means as an integrated source of electric energy.

Still another object is to provide a ski boot with electric devices capable of long term operation before any successive recharging of the storage batteries.

A further object is to realize a ski boot with devices adapted to be integrated to other electric and/or electronic devices provided in the ski.

This aim as well as these and other objects are achieved by a ski boot with self-powered electric and/or electronic devices, characterized in that it has its outer surface covered by a plurality of evenly distributed photovoltaic cells, said cells being reversably connectable together as a function of the instantaneous supply characteristics of current by means of an electronic control circuit, so as to allow recharging of a series of storage batteries, said storage batteries supplying electric service means provided in the boot and electronic control means also provided in the boot and integratable with other auxiliary means provided in the ski.

BRIEF DESCRIPTION OF THE DRAWING

Further features and advantages of the invention will be apparent from the detailed description of a preferred embodiment given by way of illustration but not of limitation and illustrated in the accompanying drawing sheets where.

DESCRIPTION OF A PREFERRED EMBODIMENT

Figure 1:
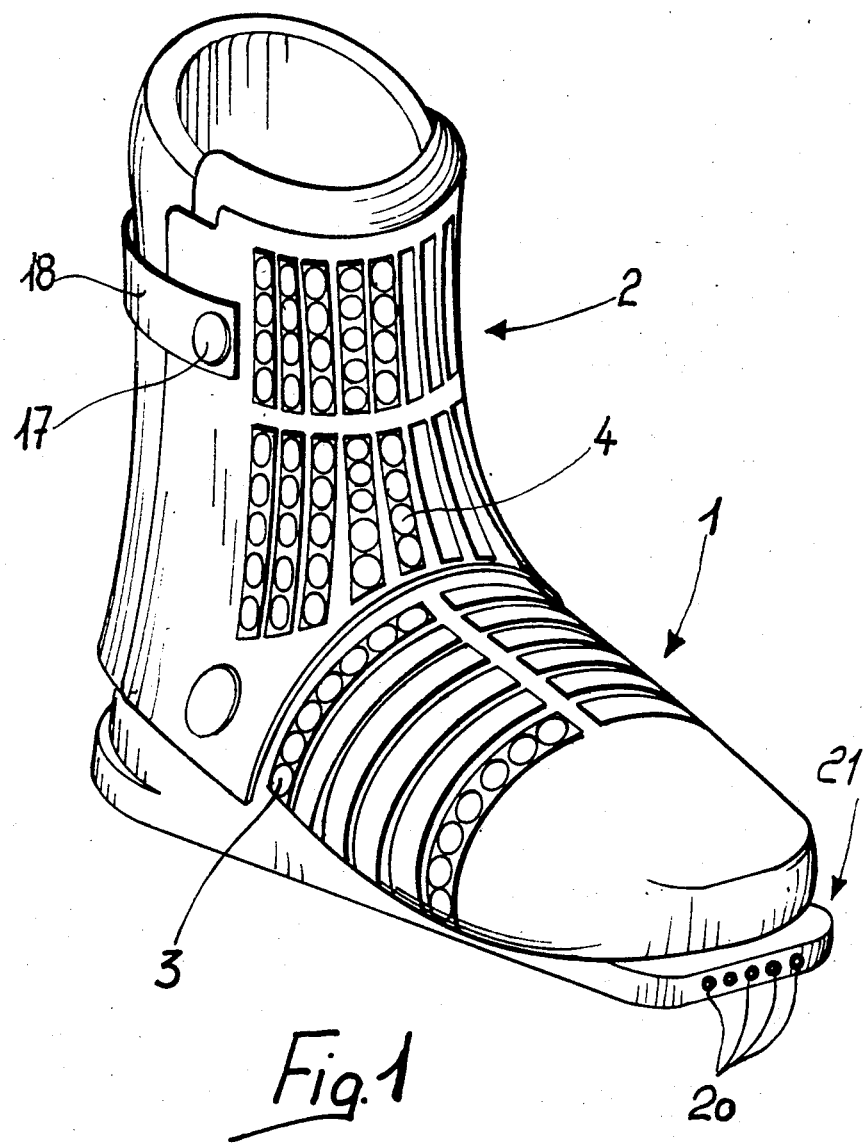
FIG. 1 shows an example of a boot made in accordance with the invention.

With reference to the cited figures, the boot according to the invention in the example shown in FIG. 1, comprises a shell 1 and a gaiter or upper 2 made by the usual techniques of injection molding of plastics.

The upper part of the shell 1 has been made such that its surface is as far as possible free of any accessory element such as closure and/or adjustment devices for the boot closure.

The surface of the shell 1 is evenly covered by a plurality of parallel strips 3, expediently composed of a photosensitive material which, when illuminated by solar radiation produces electric current.

Subdivision into several parallel strips affords sufficient elasticity to the structure, so that the individual cells or groups of cells are unaffected by excessive loads during the stresses to which the boot is subjected.

In practice the subdivision is to be made such that the cells are not subjected to bending which could determine their breaking and hence the impossibility of generating electric current.

A similar plurality of solar cells subdivided into side-by-side strips is also provided in the gaiter 2 and is indicated by 4.

Figure 2:
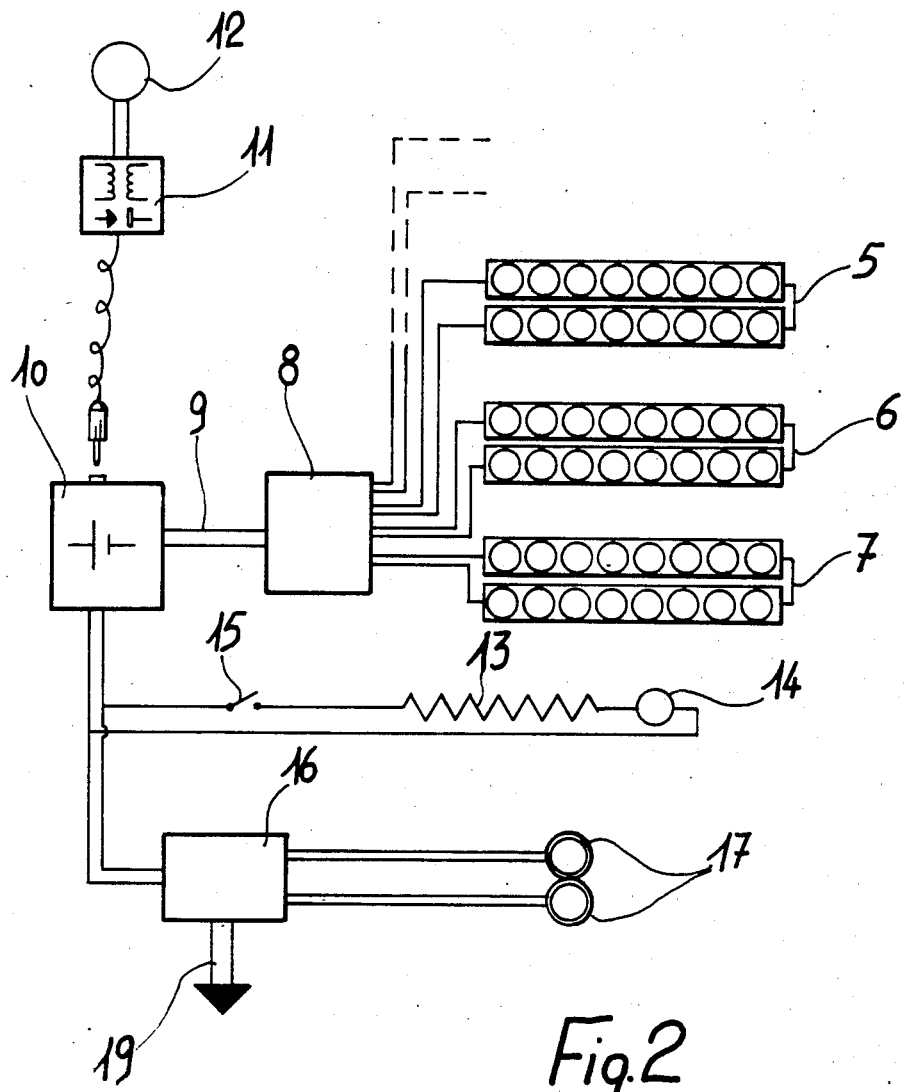
FIG. 2 shows a diagram of the electric and electronic devices provided in the boot.

In FIG. 2 there is shown how this plurality of electric current generating elements by the effect of solar radiation cooperate with storage and control means.

More particularly the individual groups of solar cells indicated in FIG. 2 by 5,6, and 7 to illustrate an assembly much larger and distributed, as we have seen, over tghe entire structure of the boot, produces current which is first sent to an electronic control circuit defining an adapter circuit 8 which has the function of verifying the voltage generated and resulting from the whole of the groups of solar cells so as to switch over their connections from serial to parallel or vice versa thereby the output current in the conductors 9 has always a voltage sufficiently higher than the charging voltage of a series of storage batteries 10 which has the task of storing the electric energy produced by the solar cells.

That series of storage batteries may be conveniently pre-powered by an external current source consisting of a rectifying transformer 11 which, powered by the normal AC current of the mains 12, allows a first charge of the storage batteries 10.

Of course, as an alternative to this energy source from the mains, there may be provided a power supply derived from the battery of a vehicle or anyhow a sufficient voltage supply to recharge the series of storage batteries 10.

The stored electric energy may be conveniently utilized in the boot to power an electric resistance 13 placed below the insole of the boot and having the task of heating the footwear preferably in a manner controlled by a contact thermostat 14 located at a convenient point of that same insole.

Conveniently there is provided a switch 15 for activation of said heater circuit adapted to switch off the heating itself when this would appear to be unnecessary.

The current generated and stored by the series of storage batteries 10 is again sent to an electronic control means 16 which has the task of controlling further service elements provided in the boot.

More particularly these elements comprise a plurality of boot closure sensors formed by pressure sensors 17 located for example in the closure means 18 of the boot gaiter and having the purpose of verifying the proper closure of the boot as well as the efforts to which the topmost part or anyhow the parts controlled of the boot are subjected in use.

The signals derived from these pressure sensors 17 are processed by the electronic control means 16 and sent for example by means of a multifilament line 19 to forward contacts 20 provided on the toe piece 21 of the boot which ae in direct contact with other elements provided in the heel of the ski boot so as to permit for example controlled opening of the safety bindings when excessive amount of stress may become dangerous for the skier.

The boot equipped with these means of electric current generation is practically independent and provided with a sufficient duration of the current storage systems so as to allow a user to ski for a sufficiently long time before such devices no longer meet their requirements due to the exhaustion of the series of storage batteries.

In practice the proposed boot proves to be provided with means of generating current, combined with means of storing said current which is then supplied to service devices such as an electric heater resistance and to safety and control devices such as sensor means adapted to verify proper operation of thed closure devices for the boot and any occurrence of dangerous situations for the skier which are immediately transmitted to the safety systems provided in the ski.

The boot thus obtained has practically normal dimensions with systems of storing current not excessively bulky while being able to supply on the average a sufficient electric power for the uses provided in the boot itself.

Of course, both the current generating means and the means for storing and utilizing the same may be differently arranged depending on the electronic and electric components which will be utilized so as to give the utmost performance and advantages.

In particular it is pointed out how convenient it is that the series of storage batteries 10 can be preliminarily recharged by an external source of electric energy such that it is perfectly and fully charged when the boot begins to be utilized and then begins to receive solar radiation which is converted into electric energy which forms a means of restoring and integrating the energy consumed by the various devices.

The series of electric storage batteries will be conveniently protected with electronic means, known per se, which prevent full discharge of the storage batteries which would produce irreversible damage to the latter.

The means of sensing unusual pressures may be conveniently arranged at the closure means of the boot or even at other areas particularly stressed such as the high part of the boot itself and the calf region.

The electric contacts which allow conveyance of the signals from the boot to other auxiliary devices provided in the ski, which in the case shown are located in the toe piece of the boot, may be arranged at any other convenient area such as for example the heel of the boot itself.

Of course, the invention illustrated may be expanded and integrated by a plurality of other electric and electronic means adapted to achieve other service functions or control functions without departing from the protection scope of the inventive concept.

The electronic components both in the current generating solar cells, as well as in the means of controlling this current generation and in the means of storage and utilization may be selected as desired depending on requirements and necessities.

Also the materials forming the boot may be conveniently selected so as to obtain rigidity and local deformability compatible with the current generating elements which are arranged on the surface of the boot.

I claim:

1. In a ski boot having a ski boot outer surface and being connectable with a ski having ski safety bindings, a self-powered ski boot control device comprising:

a plurality of photovoltaic cells evenly arranged on said ski boot outer surface, an electronic control circuit connected with said photovoltaic cells for mutually connecting said photovoltaic cells and generating a supply current having desired instantaneous characteristics, storage batteries connected to said electronic control circuit for receiving therefrom said supply current, electric service elements including boot closure sensors and overload sensors fed by said storage batteries and located in present areas of said boot for generating sensors signals indicating selectively boot opening and overload conditions, and electronic control means fed by said storage batteries and connected to said electric service elements for receiving therefrom said sensor signals and generating control signals supplied to the ski safety buildings for actuation thereof.

2. A control device according to claim 1, further comprising first contacts electrically connected to said electronic control means for receiving therefrom said control signals, and further auxiliary contacts arranged on said safety bindings to be brought in contact, in a use position, with said first contacts for receiving therefrom said control signals.

3. In a ski boot having a ski boot outer surface including means for connecting with a ski having ski safety bindings, a self-powered ski boot control device comprising:

a plurality of photovoltaic cells evenly arranged on said ski boot outer surface, an electronic control circuit connected with said photovoltaic cells for mutually connecting said photovoltaic cells selectively in series and in parallel and generating a supply signal having a voltage value greater than a preset desired value.

storage batteries connected to said electronic control circuit for receiving therefrom and being recharged by said supply signal, electric service elements including boot closure sensors and overload sensors fed by said storage batteries and located in preset areas of said boot for generating sensors signals indicating selectively boot opening and overload conditions, and electronic control means fed by said storage batteries and connected to said electric service elements for receiving therefrom said sensor signals and generating control signals supplied to auxiliary members in the ski safety bindings cooperated with said electronic control means for actuation of said ski safety bindings.

4. A control device according to claim 3, further comprising first contacts electrically connected to said electronic control means for receiving therefrom said control signals, wherein said auxiliary members comprise further auxiliary contacts arranged on said safety bindings to be brought in contact, in a use position, with said first contacts for receiving therefrom said control signals.

5. In a ski boot having an upper and a shell defining a ski boot outer surface including means for connection with a ski having ski safety bindings, a self-powered ski boot control device comprising:
- a plurality of photovoltaic cells evenly arranged on said ski boot outer surface,
- an electronic control circuit connected with said photovoltaic cells for mutually connecting said photovoltaic cells selectively in series and in parallel and generating a supply signal having a voltage value greater than a preset desired value,
- storage batteries connected to said electronic control circuit for receiving therefrom and being recharged by said supply signal,
- electric service elements including boot closure sensors and overload sensors fed by said storage batteries and located in preset areas of said boot, such as a high upper portion, for generating sensors signals indicating selectively boot opening and overload conditions, and
- electronic control means fed by said storage batteries and connected to said electric service elements for receiving therefrom said sensor signals and generating control signals supplied to the safety bindings of the ski for actuation thereof.

6. A control device according to claim 5, further comprising first contacts located at said boot shell and electrically connected to said electronic control means for receiving therefrom said control signals, wherein said auxiliary members comprise further auxiliary contacts arranged on said safety bindings to be brought in contact, in a use position, with said first contacts for receiving therefrom said control signals.

7. A control device according to claim 6, wherein said first contacts are located at a toe portion of said boot shell.

8. A control device according to claim 6, wherein said first contacts are located at a heel portion of said boot shell and are connected to forward contacts arranged at a toe portion of said boot shell.

9. A control device according to claim 5, further comprising boot heating means connected and fed by said storage batteries, said heating means including a resistance located in an insole of said boot and thermostatic control means cooperating with said resistance.

* * * * *